United States Patent Office 2,934,438
Patented Apr. 26, 1960

2,934,438

PRESERVATION PROCESS WITH ALKYL GUANIDINES

Harold David Michener and James C. Lewis, Berkeley, Calif., assignors to the United States of America as represented by the Secretary of Agriculture No Drawing. Application March 20, 1958
Serial No. 722,821

4 Claims. (Cl. 99—150)

(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to the preservation of foodstuffs which are normally subject to microbial spoilage. More particularly, the invention concerns, and has as its prime object, the provision of novel processes for treating such substances whereby to destroy the microbial population which they harbor to the end that the substances can be preserved without spoilage.

The commonest method of sterilizing foodstuffs involves application of heat. Such procedure though widely used is subject to certain disadvantages. A particular problem is that the degree of heating required to destroy the infesting microbial life, especially spores, often causes undesirable changes in the intrinsic properties of the substances in question. Depending on the composition of the substance being subjected to the heat sterilization, such deleterious changes may occur as for example: denaturation of proteins; degradation of starch or other high polymers into smaller fragments; hydrolysis of ester, peptide, and other structures susceptible to hydrolysis; decomposition of labile compounds such as vitamins, flavor components, etc. The problems which are encountered are particularly demonstrated by reference to canning of foods. The common canning method of preserving perishable foods involves placing the food in a sealed container—usually a can—and then subjecting the container and its contents to heat for an extended period of time. This method is effective and universally used but has the disadvantage that the combination of temperature and heating time adequate to destroy the microbial population of the foodstuff is deleterious to the foodstuff itself, because some forms of mircobial life, particularly bacterial spores, are very resistant to heat. For example, in non-acid foods the spores of *Bacillus stearothermophilus* and *Clostridium botulinum* are destroyed only after prolonged heating at 240° F. Both of these organisms must be destroyed for a successful pack since the former is the cause of flat-souring and the latter the cause of development of a deadly toxin in the food. Modern processors use temperatures well above 212° F. and long periods of heating (as high as 60-200 minutes, or more) to insure destruction of these organisms. For example, an authoritative canner's association recommends the following minimum heating times for processing vegetables in No. 2 cans at 240° F., namely: green beans, 20 min.; carrots, 30 min.; peas, 35 min.; corn, 50 min. As a result of such drastic heat treatment, the color, flavor, and texture of the product are necessarily adversely affected. Thus the majority of ordinary canned foods are inferior in color, texture, and flavor to the fresh-cooked products.

It has now been found that if certain agents are incorporated into the substance to be preserved prior to heat-processing the disadvantages outlined above are obviated. That is, only a relatively mild heat treatment is necessary to provide a sterile product whereby deleterious changes to the characteristics of the substances are greatly minimized. For example, foods canned in accordance with the invention are markedly superior in color, flavor, and texture as compared to conventional canned products.

The effectiveness of the process of the invention is based on the fact, hitherto unknown, that the agents described herein possess the ability to markedly decrease the thermal resistance of bacterial spores. That is, bacterial spores in the presence of these agents are killed by a much smaller amount of heat than required in the absence of the agent. As a direct consequence of this property, substances can be successfully sterilized with the application of much less heat than that which would be required to sterilize the product in the absence of the additive.

It is to be emphasized that the ability of the herein-described compounds to decrease thermal resistance of bacterial spores is unusual. We have tested some 600 different substances and have found 550 of these to possess negligible ability to decrease thermal resistance of spores. Also, of the 50 substances remaining, only 26 were sufficiently active to warrant further investigation. In conducting these tests, spores of *Clostridium* sp. PA–3679, an organism commonly used in evaluating food sterilization processes, were suspended in pea-pork broth containing the substance to be tested, and sealed in thermal death time tubes. Each tube contained approximately $6 \times 10^5$ spores in 2 ml. of broth. Appropriate controls with no test substances were included in each run. The tubes were heated sufficiently (10 to 14 min. at 113° C. in an oil bath) to kill 75 to 95% of the spores in the control tubes. The contents of the tubes after cooling were diluted 1:1000 and plated on agar to count the surviving spores. By comparing the counts of the controls and samples containing additives, the effect of the additive on the D value can be ascertained, the D value being the time required at a given temperature to kill 90% of the spores. Surprisingly enough, our tests indicated that many antibiotics did not materially reduce the value. Among these were: actinomycin, actithiazic acid, aspergillic acid, bacitracin, burdock antibiotic, circulin sulphate, citrinin, chlorotetracycline, clavicin, comirin, dihydroquercetin, dihydrotomatidine, endomycin, fumagillin, grifolin, helixins A and B, licheniformin A5, neomycin, nigericin, oxytetracycline, pleocidin, polymixin D, streptomycin, streptothricin, subtenolin, tetracycline, tomatodine, tomatine, usnic acid, and penicillin.

It is also to be noted that the process of this invention does not depend on any ability of the agents to destroy microbial forms on contact. Thus the agents of the invention exhibit little if any ability to destroy microbes, particularly spores, on mere contact. It is only by the cooperative effect of the agents and heat that the extraordinary destruction of bacterial spores is attained.

The agents employed in accordance with the invention are defined as alkyl guanidines. These compounds contain the basic guanidine nucleus

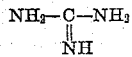

wherein at least one of the hydrogen atoms is replaced by an alkyl group. Preferably, the compound should have at least one alkyl group of 6 or more carbon atoms. Illustrative examples of compounds contemplated by the invention are methyl guanidine, ethyl guanidine, propyl guanidine, isopropyl guanidine, butyl guanidine, hexyl guanidine, octyl guanidine, decyl guanidine, dodecyl guanidine, tetradecyl guanidine, hexadecyl guanidine, octadecyl guanidine, N,N'-dimethyl guanidine, N,N'-diethyl guanidine, N,N'-dipropyl guanidine, N,N'-diisopropyl guanidine, N,N'-dibutyl guanidine, N,N'-dihexyl guanidine, N,N'-dioctyl guanidine, N,N'-didecyl guanidine, N,N'-didodecyl guanidine, N,N'-ditetradecyl guanidine, N,N'-dihexadecyl guanidine, N,N'-dioctadecyl guanidine, N-ethyl, N'-dodecyl guanidine, and N-ethyl, N'-hexadecyl guanidine.

A preferred agent is dodecyl guanidine which in the test explained hereinabove gives a reduction in D value of 86% at a concentration of 500 p.p.m. and a reduction in D value of 45% at a concentration of 170 p.p.m.

The alkyl guanidines are most conveniently employed in the form of their salts, for example their sulphates, hydrochlorides, or hydrobromides. The particular acid is, of course, unimportant as the activity of the salt is due to the alkyl guanidine moiety. Thus one can use salts of the alkyl guanidines with any non-toxic acid as sulphuric, hydrochloric, hydrobromic, citric, phosphoric, tartaric, acetic, etc.

In preserving substances in accordance with the invention it is only necessary to incorporate one of the agents as herein described with the substance and then subject the treated substance to heat to effectuate the sterilization. Ordinarily, the substance to be preserved and the added agent are sealed in a container prior to heat treatment thus to prevent reinfection of the sterilized product with microbial forms from the environment. Thus, for example, in the preservation of foods the agent is incorporated with the food, the treated food is sealed in a can or other suitable container, and the container and contents subjected to a heat treatment.

The concentration of the agent to be used depends on such factors as the nature of the substance to be preserved, especially the microbial population thereof, the activity of the selected agent, and the level to which the usual heat-processing program is to be decreased while still maintaining a sterile product. In many cases as little as 50 p.p.m. of the agent will give a reduction in thermal resistance and the concentration can be increased as high as needed, for example to 1000 p.p.m. to get further reduction in thermal resistance of the spores, hence further reduction in the amount of heat processing required for a satisfactory sterilization.

The temperature and time for heating the substance containing the added agent will vary depending on such factors as the nature of the substance to be preserved, its microbial population, the activity of the selected agent and the concentration thereof. For example, in the preservation of foods in accordance with the invention, such factors as acidity of the food, good sanitary condition of the food, and high concentration of the added agent make for a lesser degree of heat treatment. Also, as in conventional canning, one must take into account the size of the container since with large containers one must allow more time for penetration of heat into the interior than with a small container. In any event, the degree of heat processing will be substantially less than with conventional sterilization, that is, in the presence of the added agent the temperature or heating time or both will be substantially less than required with conventional sterilization. In any particular case the minimum heat processing treatment can be ascertained by running pilot experiments in which containers of the substance to be preserved plus the additive are subjected to varying conditions of temperature and time followed by microbiological examinations to determine the minimum heating levels required to ensure production of a sterile product.

Since the temperature and heating time are influenced by so many factors, it is impossible to set forth any numerical limits on these conditions. The heating conditions can best be described as heating at a temperature and a time sufficient to render the product essentially sterile, the combination of temperature and time of heating required to achieve this end being substantially less than would be required in the absence of the alkyl guanidine.

The preservation process of this invention is of wide versatility and can be applied to foodstuffs of every type, for example, fruits, vegetables, milk, eggs, meat, fish, cereal products, bread, cheese, and so forth. Liquid foodstuffs such as juices, concentrates, purees, sauces, soups, extracts, and beverages of every type are included. The method by which the agent is incorporated in the food is not critical. In case of foods packed with liquid—water, brine, syrup, puree, sauce, gravy, etc.—it is easiest to disperse the agent in the liquid and add this liquid to the pack. In the case of dry pack products, the food may be dipped in a solution of the agent or coated with a composition of the agent mixed with a suitable carrier such as salt, sugar, starch, algins, natural gums, gelatin, pectin, low-methoxyl pectins, methyl cellulose, edible waxes, edible oils, and so forth.

Although the invention is particularly adapted for the preservation of foods, it may also be applied for the preservation of any substance which is normally susceptible to microbial spoilage. Thus, for example, the invention may be applied for the preservation of such substances as animal glues and muscilages; dextrins; starch pastes and solutions; cosmetic, medicinal, and dental preparations; vitamin preparations; pastes, solutions, or other preparations of natural gums such as tragacanth, arabic, acacia, karaya, locust bean, agar-agar, pectin, algin, etc.; fermentation broths, mashes, and residues from fermentation processes; whey; wines and vinegars; animal feeds and ingredients of animal feeds such as fish meals, blood meals, feather meal, meat scraps, bone meal, tankage, grains, and oil-seed meals; proteins and protein hydrolysates; textile printing pastes; paints containing proteins or other spoilage dispersing agents; solutions of bark extracts or other tanning agents; molasses; by-products or wastes that contain potentially valuable carbohydrate, proteinous, or fat ingredients such as stick liquor, corn steep liquor, fruit cannery wastes, citrus peels, cull fruit and vegetables, tops of root vegetables, distillers' slops, pulp liquors, wash water from textile de-sizing operations, waste liquors from wool scouring plants, dairy and slaughter house wastes and liquors, etc.

The following example demonstrates particular conditions, steps, and materials within the scope of the invention. It is understood that this example is furnished only by way of illustration and not limitation.

It is to be noted that in certain of the samples, no agent was added. These control experiments are included for comparison purposes only. The abbreviation p.p.m. used herein refers to parts per million.

*Example*

A series of tin cans were filled with chopped asparagus bearing a natural inoculum of thermophilic organisms. One half of the cans contained only the asparagus; to the other half was added dodecyl guanidine hydrobromide in a concentration of 550 p.p.m. The cans were then sealed in the usual way.

All of the cans were then heated to 240° F. (115° C.) in a retort designed for rapid heating and rapid cooling after the heating was completed. Different times of heating, varying from 5 min. to 55 min. were employed with different lots of cans (both control and treated).

The cans after cooling were then stored at 50° C. for a month and observed for swelling as an indication of spoilage. (This temperature of storage is nearly optimum for growth of the naturally contaminating thermophilic organisms, which have very heat resistant spores.) By observation of the cans during storage, it was possible to select the heating time which was just sufficient to prevent spoilage. For example, if a product spoiled after 5 min. heating but not after 7 minutes' heating, it was concluded that 7 minutes was the proper heating time.

The results obtained are tabulated below—

| Additive | Time at 240° F. required to prevent spoilage, min. |
|---|---|
| None (control) | 30 to 55. |
| Dodecyl guanidine·HBr | less than 5. |

The above data indicate the effectiveness of the additive as a good pack was obtained with only 5 min. heating whereas with the control a heating for 30 to 55 minutes was required to obtain the equivalent result.

Having thus described the invention, what is claimed is:

1. A process for preserving a foodstuff normally subject to microbial spoilage which comprises incorporating an alkyl guanidine therewith in proportion about from 50 to 1000 p.p.m., and subjecting the resulting substance to heat at a temperature and a time sufficient to produce an essentially sterile substance, the combination of temperature and time of heating being substantially less than would be required to attain sterility in the absence of said alkyl guanidine.

2. The process of claim 1 wherein the alkyl guanidine is dodecyl guanidine.

3. A process for preserving a food stuff which is normally subject to microbial spoilage which comprises incorporating an alkyl guanidine with the foodstuff, in proportion about from 50 to 1000 p.p.m., sealing the treated foodstuff in a container and subjecting the foodstuff to heat at a temperature and a time sufficient to produce an essentially sterile product, the combination of temperature and time for heating being substantially less than would be required to attain sterility in the absence of said alkyl guanidine.

4. The process of claim 3 wherein the alkyl guanidine is dodecyl guanidine.

References Cited in the file of this patent

UNITED STATES PATENTS 2,213,474　　Puetzer　----------------　Sept. 3, 1940

OTHER REFERENCES

Food Industries, October 1950, p. 40.
Food Research, September–October 1954, p. 483.